United States Patent [19]

Soper

[11] Patent Number: 4,498,458

[45] Date of Patent: Feb. 12, 1985

[54] SOLAR HEATING PANEL

[76] Inventor: Louis H. Soper, 36742 Oak St., Fremont, Calif. 94536

[21] Appl. No.: 494,091

[22] Filed: May 12, 1983

Related U.S. Application Data

[63] Continuation-in-part of Ser. No. 228,111, Sep. 23, 1981, abandoned.

[51] Int. Cl.³ .............................................. F24J 3/02
[52] U.S. Cl. ................................. 126/429; 126/431; 126/445; 126/449; 126/450; 165/57
[58] Field of Search ............. 126/428, 429, 431, 432, 126/449, 450, 445; 165/56, 57, 168–170; 52/171, 302, 303, 304

[56] References Cited

U.S. PATENT DOCUMENTS

| 2,559,870 | 7/1951 | Gay | 165/49 X |
|---|---|---|---|
| 3,863,621 | 2/1975 | Schoenfelder | 126/449 |
| 4,068,652 | 1/1978 | Worthington | 165/485 X |
| 4,126,270 | 11/1978 | Hummel | 126/432 X |
| 4,141,339 | 2/1979 | Weinstein | 126/450 X |
| 4,265,221 | 5/1981 | Whinnery | 126/429 X |
| 4,265,222 | 5/1981 | Kapany et al. | 126/431 |
| 4,313,429 | 2/1982 | McAlaster | 126/445 |
| 4,344,413 | 8/1982 | Watkins et al. | 126/429 |
| 4,353,357 | 10/1982 | Nelson | 126/450 |
| 4,383,521 | 5/1983 | Bounds | 126/430 |
| 4,426,997 | 1/1984 | Bette et al. | 126/445 |

FOREIGN PATENT DOCUMENTS 0005110 10/1979 European Pat. Off. ............ 126/431

Primary Examiner—Margaret A. Focarino
Attorney, Agent, or Firm—Burns, Doane, Swecker & Mathis

[57] ABSTRACT

A metal collector panel for use in a solar heating assembly of generally flat rectangular shape with a plurality of parallel channel members which run from the long edges of the panel and which act as baffles when the panel is enclosed between side and end frame members and having a transparent front face through which solar rays pass for absorption by the baffle members. The baffle members each having openings for air flow through the panel from the assembly inlet at one end to the outlet at the other end of the assembly. The studs and rafters of the buildings can serve as side frame members for the panel assembly.

2 Claims, 6 Drawing Figures

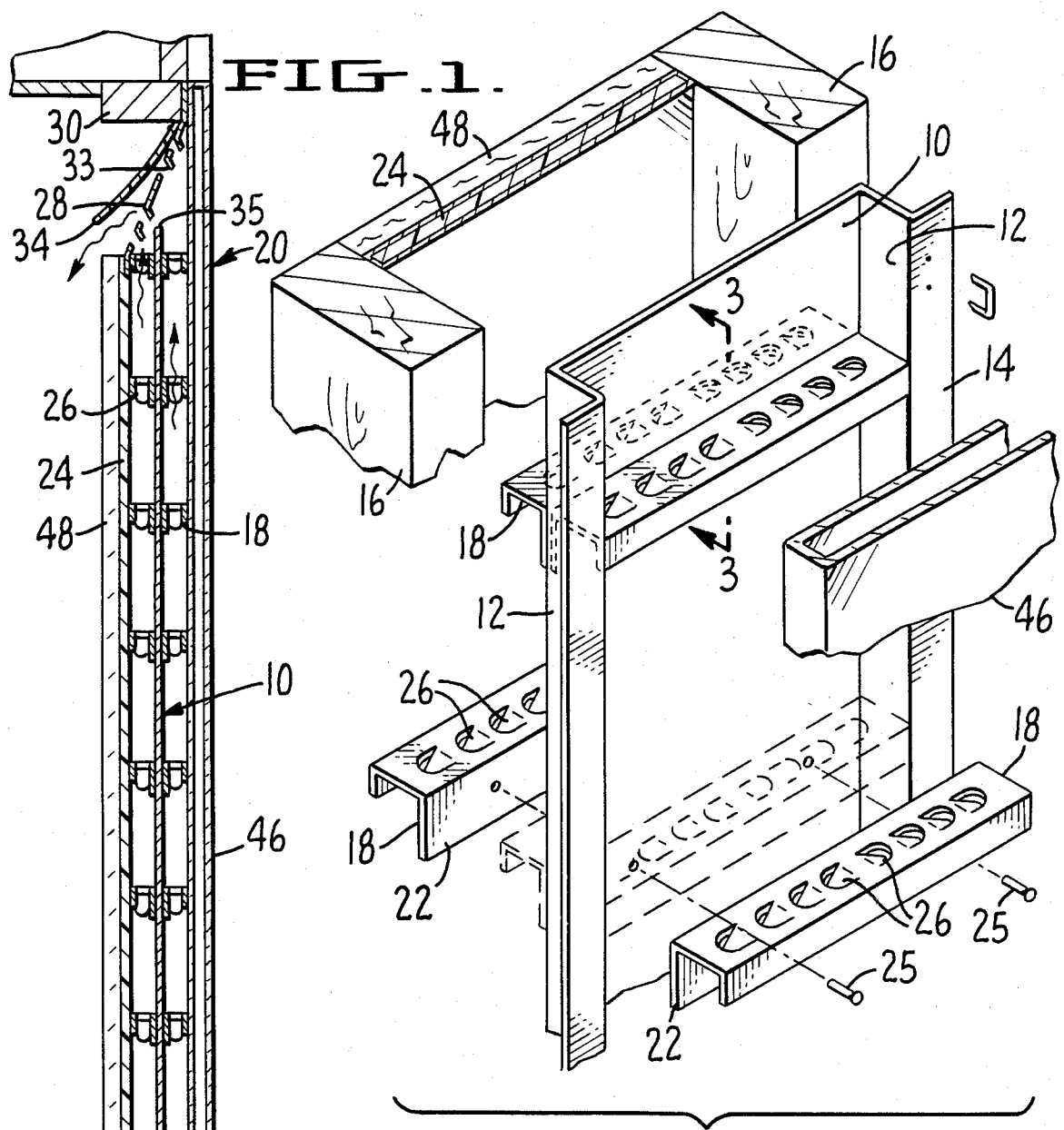
FIG.1.
FIG.2.
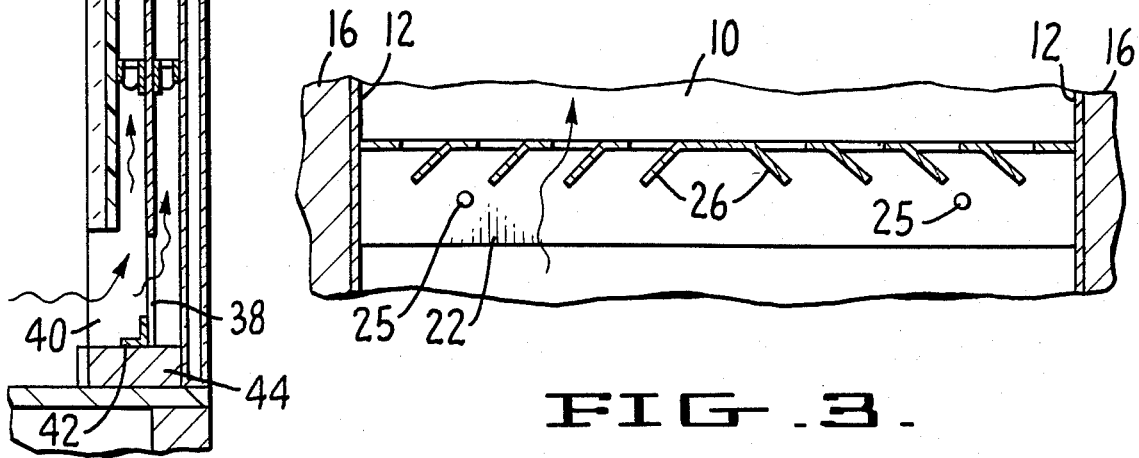
FIG.3.

SOLAR HEATING PANEL

RELATED APPLICATIONS

This is a continuation-in-part of U.S. patent application Ser. No. 228,111 filed Sept. 23, 1981, and now abandoned.

BACKGROUND OF THE INVENTION

1. Field of the Invention

This invention generally relates to devices using solar energy to heat interior structures. The particular assembly described herein is heated by solar energy and transfers heat to a circulating air mass. The device of the invention is primarily a metal collector panel insert adapted to absorb and transfer solar heat in an efficient manner.

2. DESCRIPTION OF THE PRIOR ART

The use of solar energy to heat interior structures is well known. U.S. Pat. No. 504,544 discloses a simple iron tube coated with carbon black which is heated by solar radiation causing the air contained therein to rise and enter the interior of a room. Typical house heating systems utilizing solar collectors are disclosed in U.S. Pat. No. 4,265,222 to Kapany where a insulating window having a louvered radiant energy absorbing screen positioned in the air space between inner and outer space apart window panes and having dampers, blowers, and duct system, an air inlet for the interior of the room, and electronic logic systems for control of the air flow within the system.

U.S. Pat. No. 3,323,054 to Hummel discloses a solar energy collector having an absorbent body exposed to sunlight, a transparent panel enclosing the absorbent body, and passageways in the body through which heated air passes as it rises towards an outlet.

U.S. Pat. No. 4,312,328 to Leyman discloses a moveable solar collector structure adapted to enclose an entryway when in one position and to open it when in another position. In its prefered form it serves as an overhead folding garage door made of a plurality of panels each of which is adapted to function as a solar collector.

The foregoing systems are more complicated and less efficient that the present invention.

SUMMARY OF THE INVENTION

This invention essentially comprises a metal collector panel or plate for insertion and fastening between adjacent wall studs or rafter of a building. The panels are of conductive metal, desirably aluminum, and are black in color. The collector panels are of any desired length, and advantageously are considerably longer than the space between adjacent studs. Attached to the front and rear faces of each collector plate are a series of J-shaped channel members arranged to run across the width of the panels at spaced intervals along the panel length in parallel relation to each other. The channels are also black in color to provide additional solar energy absorption. The channel members are also desirably of aluminum. Pre cut and bent fin-like spaced openings in the base areas of the channels to facilitate air circulation. A transparent panel is placed against the studs and rests flush against the upstanding short legs of the J-channels on the outside face of the collector plate. Insulating sheets are placed in the same manner on the inside wall of the plate against the respective short legs of the channels at the rear or interior side of the assembly. The assembly includes air intake means at its base and outlet means at the top. The air is heated by the baffles and plates as it rises and circulate through the assembly. The air may be directed to a plenum forming part of a hot water heating system or may be sent directly into a room or other area to be heated.

BRIEF DESCRIPTION OF THE DRAWINGS

In the drawings, FIG. 1 is a vertical sectional view of the solar heating assembly of the invention showing a metal collector panel with the plurality of J-shaped channel members which function as baffles mounted thereon between studs in a typical installation.

FIG. 2 is a perspective view of a broken away section of the collector panel with the J-shaped channels mounted thereon, and the panel removed from the assembly showing the relative position of the principal parts of the assembly, including the studs against which the panel is normally seated.

FIG. 3 is a broken away section taken along line 3—3 of FIG. 2 looking in the direction of the arrows and showing the J-shaped baffles when mounted on the panel.

DESCRIPTION OF THE PREFERRED EMBODIMENT

Figure 4:
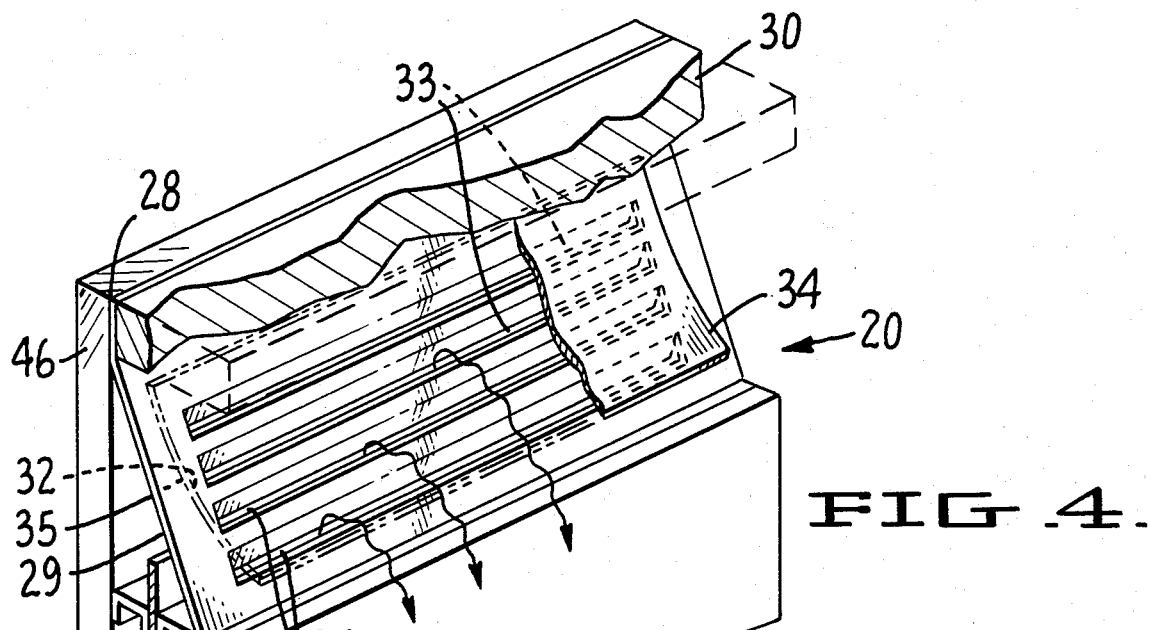
FIG. 4 is a broken away view of the top portion of a typical panel assembly with the stud that forms the visible side of the assembly removed and with the panel facing the interior.

As will be seen by reference to the drawings, an elongated metal plate or core comprises the collector panel 10 of the invention. It is normally made from sheet aluminum. It is of a rectangular shape and has each of its long edges folded at 90° to form side 12 and is then folded at a 90° angle to form flange 14 to provide a channel along the entire length of the panel. This arrangement enables panel 10 to nest within adjacent studs 16 in a vertical wall or in between adjacent rafters in a roof. In a typical installation, the distance between the studs 16 is about 16 inches and the core panel 10 in the normally flat section is of approximately the same width so that it may nest snugly between the studs 16 and the folded plate ends 12, with end flanges 14 resting against the exterior side of studs 16. As shown in FIG. 2, suitable staples 18 and the like are used on the faces that seat on the studs to permanently fasten the panel when it is assembled. Metal panel 10 can be made of any required width as dictated by the distance between studs or rafters.

A series of J-shaped channel members 18 are mounted across the face of the core panel 10 in parallel relation to each other on both the front face and the back face of the core panel 10 which are respectively directed to the exterior and interior sides of the panel assembly 20. J-shaped channels 18 serve as baffles and can be mounted in any suitable manner on panel 10. In the embodiment shown in the drawings channels 18 are mounted by rivets 25 driven through the long walls 22 of the J-shaped channels. In the embodiment shown rivets 25 fasten both the front and back baffles 18 to the core panel 10 as shown in FIG. 3. It will also be seen that each baffle 18 is of a length corresponding to the width of core panel 10 and of a depth which, in the case of the exterior face, corresponds to the depth of the bent wall 12 to enable it to nest between studs 16 so that flanges 14 can rest on the studs. In the case of the rear face of panel 10 on the interior side the channels 18 on that side are of a depth to enable insulation panel 24 to abut the back or interior side of the assembly 20 when inserted in place between the studs, all as shown in FIG. 1.

Each baffle has struck out portions or fins 26 at spaced points along its length. In the embodiment shown in the drawings fins 26 are of a generally half-moon shape and are advantageously bent to a degree which will enable the air to flow through the panel 10 in a manner to assure maximum contact with the solar heated portions of the core panel 10 and the baffles. The fins on one side of each channel can be bent to direct flow in one direction and on the other side they are bent to assure flow in another direction.

As will be noted by reference to FIG. 1, there are several series of baffles or channels 18 arranged in parallel across the length of the core panel 10 to insure maximum contact for the purpose of heating the air flowing through the panel assembly.

As heretofore stated, the core panel 10 is desirably of light gauge aluminum sheet with a baked on black finish for ease of handling and absorption of the solar energy when in assembled position. The baffles 18 may be of similar material finish.

At the top and bottom of each panel assembly 20, suitable fastening or mounting means are provided. In FIG. 4 the top of assembly 20 uses a single Z-shaped channel section 28 on the interior side of the assembly and against the top edge of which is fastened between the glazing 46 and top frame member 30 running the width of the assembly. The length of the top channel 28 is shown as approximately the width of panel 10.

The top section of panel 10 is cut away from the core panel (see FIG. 4) below diagonal face 29 of channel 28 to enable air flowing through the back of the assembly 20 adjacent the exterior side to flow out through top opening 33 in the wall of the panel assembly facing the interior along with the air flowing past the rear face of panel 10. Diagonal face 29 has slits or openings across a portion of its width to provide an outer screen or grill 35. As will be noted, the air is controlled by a flutter valve 34 which rests on grill 35. Any suitable means for permitting the warm air to flow into a room or other area wherein it is to be used is satisfactory. Normally, the outlet for the panel assembly 20 would be in the lower area of the room adjacent the baseboard.

At the bottom or base area of panel 10, another half-moon section is cut away to form opening 38 which is in communication with inlet 40, normally in the wall of the assembly facing the interior and through which air to be heated enters the assembly. The opening 38 at the bottom end of the core panel 10 enables air to flow through the front and back air flow zones of the panel assembly. A channel or angle section 42 is provided at the base of assembly 20 to enable panel 10 to be fastened at its bottom edges. Channel 42, as in the case of top channel 28, desirably runs the width of the assembly and is fastened to the adjacent cross frame member 44 at the base of the panel assembly. As will be noted, both the top and bottom channels 28 and 42 are of a height and width to accomodate core panel 10 when it is installed. In actual use, the channels are installed at the desired positions at the top and the bottom of an intended panel assembly. After suitably fastening the two plates, the core panel, generally with the assembled baffle channels 18, is then inserted and nailed into the studs as heretofore discussed.

In the embodiment shown, a double glazed transparent face plate or panel 46 is used on the exterior wall of assembly 20 and fastened against the studs 16 and the flanged 14 edges of the core panel 10 which seat against the studs. Desirably, the exterior panel 46 is double glazed. For convenience and economy a single sheet of transparent material covering two or more adjacent assemblies 20 may be used where winter temperatures do not go below 32° F. As is well understood, the solar rays pass through transparent panel 46 to heat core panel 10.

On the wall of panel assembly 20 facing the interior and extending the length and width of the assembly between studs an insulation panel 24 (heretofore mentioned) is used. It is of any suitable material, such as aluminum foil styrofoam and may be installed to seat directly against the channel members or baffles 18 mounted on the back wall of the core panel 18. Additional insulation material 48, also of glass fiber or the like may be installed against the insulating panel 24 at the back of the studs if insulation requirements necessitate it.

Figure 5:
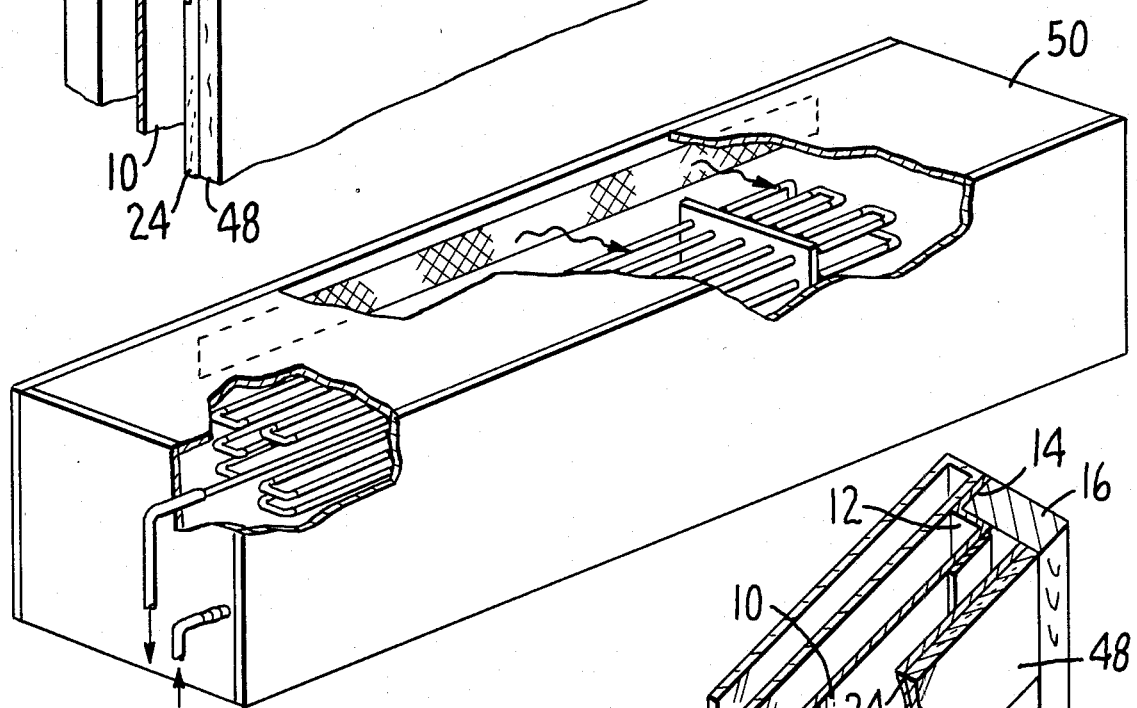
FIG. 5 is a perspective view of an insulated plenum with portions broken away showing the pipe system therein that is used for the heating of water by the heated air received from the panel assembly.
Figure 6:
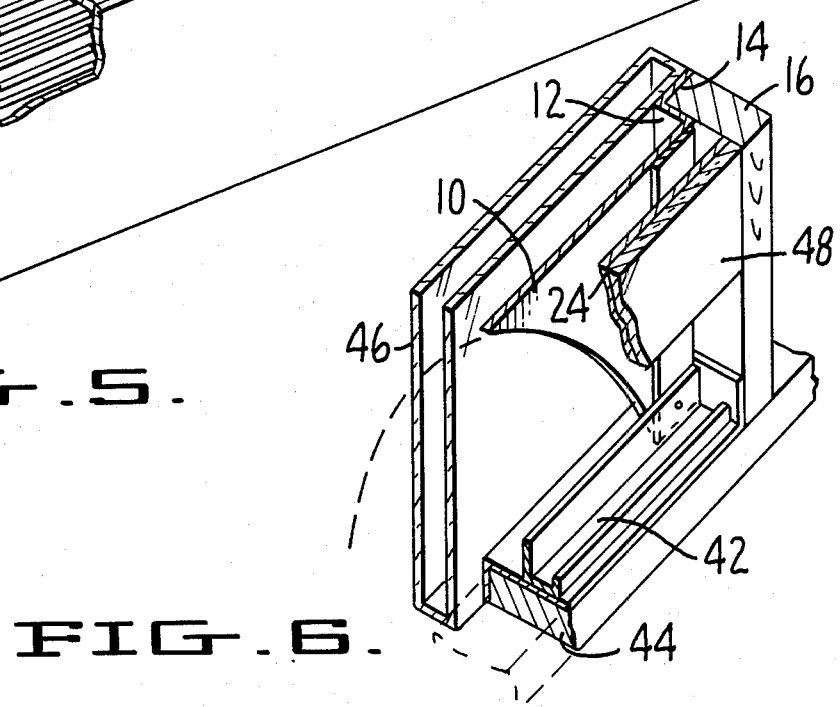
FIG. 6 is a view of the same type as FIG. 4 showing the base of a panel assembly as it is positioned in the bottom area thereof and facing the interior.

In operation the radiant energy of the sun is transmitted through the glazing panel and absorbed by the collector panel and channel shaped baffles. Thereafter air flowing through the panel assembly is heated in the manner heretofore described. The hot air flowing from panel assembly 20 may be directed to an insulated plenum or storage section 50 (FIG. 5) having water pipes in a circuit of copper tubing 52 or the like through which the water may be rapidly and efficiently heated. Copper tubing 52 or the like is mounted on suitable holders well known to those skilled in the art. The tube is arranged so that the water will flow in serpentine fashion through several feet of the tubing before it is sufficiently heated to flow out of the plenum. The heated water may be held for a sustained period of time.

The foregoing represents the preferred embodiment of the invention. However, it is to be understood that the invention can be utilized in a modified form. For example, the core panel can be inserted between two elongated independent side and end members spaced at preselected distances from each other to form the walls of a panel assembly. Such assembly can be assembled as a unit independent of the wall or roof structure per se.

In like manner, the rivet type fastening elements may be omitted and other fasteners used for attaching the baffles 28 to the core plate 10, such as clips or other readily assembleable means to enable the final product to be readily mounted.

I claim:

1. A solar collector plate for use in a solar panel assembly comprising an elongated flat sheet metal plate of rectangular shape adapted to be positioned between adjacent studs or rafters forming part of the frame of a building structure which comprise the sidewalls of said solar panel assembly, said collector plate having a length corresponding to the length of said solar panel assembly and width corresponding to the distance between said adjacent studs or rafters and adapted to be positioned intermediate an outer transparent glazing panel and an inner insulating panel comprising the respective outer and inner faces of said panel assembly to thereby provide inner and outer sections within and along the length of said panel assembly, said collector plate including a base area having an opening through which air to be heated enters said assembly and flows upwardly in separate paths through said inner and outer sections and outlet means at the top of said panel assembly whereby said heated air may be discharged for use, a series of baffle members fastened to both the front and rear faces of said collector plate in parallel relation at spaced intervals along the length thereof, each of said baffle members having a length corresponding to the width of said collector plate with one series of baffle members thereof having a width extending from said front face of said collector plate to said outer transparent face and another series of baffle members having a width extending from said rear face of said collector plate to said inner insulating wall, each said baffle member being a J-shaped channel having a flat top portion adapted to abut against said collector plate and a flat bottom portion adapted to abut against said outer transparent glazing panel and said inner insulating panel, respectively, and means in the base of each of said baffle members for directing the flow of air through and along the length of said inner and outer sections of said panel assembly.

2. The collector plate of claim 1 wherein said flat plate and said baffle members are black in color and are adapted to receive and absorb solar energy.

* * * * *